United States Patent
Weiss

(10) Patent No.: US 7,806,021 B2
(45) Date of Patent: *Oct. 5, 2010

(54) CONTROL CABLE ADJUSTMENT DEVICE

(75) Inventor: Martin Weiss, Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/336,604

(22) Filed: Dec. 17, 2008

(65) Prior Publication Data
US 2009/0095117 A1 Apr. 16, 2009

Related U.S. Application Data

(62) Division of application No. 10/605,852, filed on Oct. 30, 2003, now Pat. No. 7,481,131.

(30) Foreign Application Priority Data

Oct. 30, 2002 (DE) ................. 102 50 435

(51) Int. Cl.
F16C 1/10 (2006.01)
(52) U.S. Cl. ................. 74/501.5 R; 74/502.2; 74/489
(58) Field of Classification Search ............ 74/501.5 R, 74/502.2, 489, 502.4, 502.6; 403/309, 310, 403/313; 280/236, 238; F16C 1/10; B62K 23/06
See application file for complete search history.

(56) References Cited

U.S. PATENT DOCUMENTS

| 3,759,352 | A | 9/1973 | Toplis |
| 4,334,438 | A | 6/1982 | Mochida |
| 4,833,937 | A | 5/1989 | Nagano |
| 4,850,240 | A | 7/1989 | White |
| 5,664,461 | A | 9/1997 | Kitamura |
| 5,674,142 | A | 10/1997 | Jordan |
| 5,906,140 | A | 5/1999 | Smith |
| 5,946,978 | A | 9/1999 | Yamashita |
| 6,324,938 | B1 | 12/2001 | Okouchi |
| 6,405,613 | B1 * | 6/2002 | Lim ......................... 74/502.4 |
| 6,604,440 | B2 * | 8/2003 | Wessel et al. ............. 74/502.2 |
| 6,729,203 | B2 | 5/2004 | Wesling et al. |
| 7,204,169 | B2 | 4/2007 | Mitchell |
| 2005/0204854 | A1 * | 9/2005 | McLaughlin et al. ....... 74/502.2 |
| 2006/0096404 | A1 * | 5/2006 | Wessel et al. ............. 74/501.6 |

FOREIGN PATENT DOCUMENTS

| DE | 7626479 U1 | 9/1976 |
| EP | 0556064 | 8/1993 |
| EP | 0916570 A2 | 5/1999 |

* cited by examiner

Primary Examiner—Vinh T. Luong
(74) Attorney, Agent, or Firm—Milan Milosevic; Lisa Serdynski

(57) ABSTRACT

A control cable adjustment device for adjusting a control cable extending between a control mechanism and an operating mechanism. The adjustment device includes an adjuster rotatably connected to a housing of the control mechanism and a spring element having at least one retention segment. The retention segment engages a detent contour of the adjuster to retain the adjuster in its current position. Another segment of the spring element may have a second function as a return spring for a gear shifter or a brake lever.

18 Claims, 4 Drawing Sheets

CONTROL CABLE ADJUSTMENT DEVICE

RELATED APPLICATION DATA

This application is a divisional of U.S. application Ser. No. 10/605,852 filed on Oct. 30, 2003, entitled "Control Cable Adjustment Device."

BACKGROUND OF THE INVENTION

The present invention relates to adjustment devices for adjusting the length of a control cable and more particularly to an adjustment device for adjusting a shifting cable or brake cable for a bicycle.

Control cable adjustment devices are used to adjust the length of a control cable or Bowden cable that connects a gear shifter to a gear change mechanism such as a derailleur or internal gear hub or connects a brake lever to a brake. The control cable includes an inner wire that slides within an outer casing or sheath. The length of the cable needs to be adjusted because elongation of the cable occurs after extended use under load and shifting or braking requires precise cable guidance. Usually the adjustment device is threaded into the shifter or brake housing, resulting in the adjustment device being indirectly braced against the bicycle frame. When the adjustment device is threaded into the housing, the sheath is shortened relative to the inner wire, which then moves loosely in the sheath.

To tighten the control cable, the adjustment device is unscrewed from the housing, resulting in the sheath being elongated relative to the inner wire. Usually the adjustment device includes a locknut or detent mechanism that holds the adjustment device in its current position and also prevents the adjustment device from being rotated in an uncontrolled manner. Various detent mechanisms are shown in U.S. Pat. No. 5,674,142; U.S. Pat. No. 4,833,937, EP 0 916 570 A2, and German Utility Model DE-GM 76 26 479.

U.S. Pat. No. 5,674,142 discloses an adjustment device having an elongated retention nut that is threaded onto an elongated mounting member of a shifter housing. The device includes a detent mechanism having detents located on an inner surface of the retention nut that are engageable with protrusions on an outer surface of the mounting member. The protrusions are located adjacent the inner end of the threads on the mounting member. A problem with this configuration is that by arranging the threads and the protrusions adjacent one another, the adjustment device is relatively long.

U.S. Pat. No. 4,833,937 discloses a detent mechanism that includes a disk rotatably connected to the adjuster and having protrusions which is biased by a spring to engage detents located on the outer surface of a stop nonrotatably connected to a shifter housing. When the adjuster is rotated the disk rotates between the protrusions to provide stepwise adjustment of a control cable. A problem with this configuration is that it requires a lot of components and requires a cover for the detent mechanism, which also unnecessarily enlarges the outside diameter of the adjustment device.

In EP 0 916 570 A2, the detent mechanism includes a spring having a first end that is secured in a slot of a brake lever housing and a second end that engages a channel in the outside diameter of the adjuster. After each complete adjustment revolution, the end of the spring element snaps into the channel provided for the control cable on the adjuster. Although this adjustment device has fewer components than the previous mentioned adjustment devices, it requires an additional slot in the brake housing to receive one end of the spring. Another problem with this configuration is that the spring reengages the insertion slot in the adjuster only after each complete revolution of the adjuster, resulting in only coarse control cable adjustment.

The detent mechanism described in DE-GM 76 26 479 generally includes an adjustment nut having external longitudinal flutes and a screw thread that is surrounded by flexible retention arms which engage the longitudinal flutes to provide the detent function. A problem with this configuration is that the externally located flexible retention arms unnecessarily enlarge the outside diameter of the adjustment device and requires a cover to prevent soiling of the detent mechanism. Therefore there is a need for a control cable adjustment device that is compact and has minimal parts.

SUMMARY OF THE INVENTION

It is an object of the present invention to provide a reliable adjustment device for shifter cables and brake cables that is economical in terms of both manufacture and installation.

This is achieved in the present invention by using components that perform multiple functions and by skillfully arranging a spring element in the adjustment device. A spring element that is already present in the control mechanism may used for a detent mechanism of the adjustment device. For example, a return spring for a release lever of a shifter, a spring on a release slider, a cable spool spring or a recovery spring for a brake lever may be additionally used as a retention spring in the detent mechanism. If these springs are too soft or too far away from the adjustment device, the spring may be stiffened and braced by suitable bracing in or on the shifter or brake lever housing. If no suitable spring of the shifter or brake lever is available, then at least an existing insertion slot required for insertion of the control cable braces the spring element required for the detent operation. Therefore, the present invention requires either no additional spring element by using an existing spring in the control mechanism or eliminates the need to have an additional slot in the shifter or brake lever housing to brace the spring element by using a control cable insertion slot already present in the shifter or brake lever housing.

The present invention provides a control cable adjustment device for adjusting a control cable extending between a control mechanism such as a shifter or brake lever and an operating mechanism such as a derailleur or brake. The adjustment device includes an adjuster rotatably connected to a housing of the shifter or brake lever and a spring element. Together the adjuster and the spring element constitute a detent mechanism. The adjuster has a first end that receives the outer casing or sheath of the control cable and a second end that has threads that are received a threaded bore of the shifter or brake lever housing. The first end of the adjuster also has grip recesses to make it easier to rotate the adjuster. A detent contour extends coaxially through the second end of the adjuster and has radially inwardly directed holding contours.

The spring element has a retention segment or leg that engages the detent contour. The detent contour is provided with enough open space to avoid impeding the operation of the spring element or the control cable during adjustment of the cable. The cross section of the detent contour may be a polygon or round with flutes or elevations. The detent contour may also have different slopes to provide different rotational forces during rotation of the adjuster. For example the adjuster may have high rotational forces in the screwing in direction and low rotational forces in the screwing out direction. The spring element extends substantially parallel with the inner wire of the control cable extending through the adjuster.

The spring element may be a wireform spring that is preloaded and has two legs or segments that perform different functions. One segment may engage the detent contour to retain the adjuster in a current position and the other segment may function as a return spring for a release lever of a shifter or a recovery spring for a brake lever. To ensure that the retention segment does not move into the detent contour as the adjuster is rotated relative to the housing, the retention segment is braced in a cutout in the housing. The cutout prevents the retention segment from entering a cable insertion slot in the adjuster. Additionally, the cable insertion slot may be arranged to extend not parallel relative to the retention segment, for example, it extends at a 30 degree angle, to prevent the retention segment from entering the insertion opening. Also, a stop may be used to prevent the retention segment from entering the insertion opening.

To increase the detent and holding forces, the retention segment of the spring element may include two retention segments that are preloaded outward and are in equilibrium. The retention segments are braced against in the housing near the adjuster so that almost no bending moments and no torsion moments are introduced into the spring element upon rotation of the adjuster.

When it is not possible to use an existing spring element within the shifter or brake lever, an additional spring element must be provided to perform the detent function. In this embodiment of the present invention, a spring element is provided having at least two retention segments preloaded outward into the detent contour of the adjuster. To ensure that the spring element does not move upon rotation of the adjuster, the spring element includes a support segment that is braced against the housing. Once the control cable is installed, the spring element may be inserted easily and without tools into the detent contour of the adjuster and the cable insertion slot.

The present invention is not limited to the adjusting of a control cable for a gear shifter or a brake lever for a bicycle but can also be used wherever a defined, constant cable length or cable tension is required in a control cable. For example, clutch cables for motorized vehicles or other motion-related cables.

These and other features and advantages of the invention will be more fully understood from the following description of certain specific embodiments of the invention taken together with the accompanying drawings.

DETAILED DESCRIPTION

Figure 1:
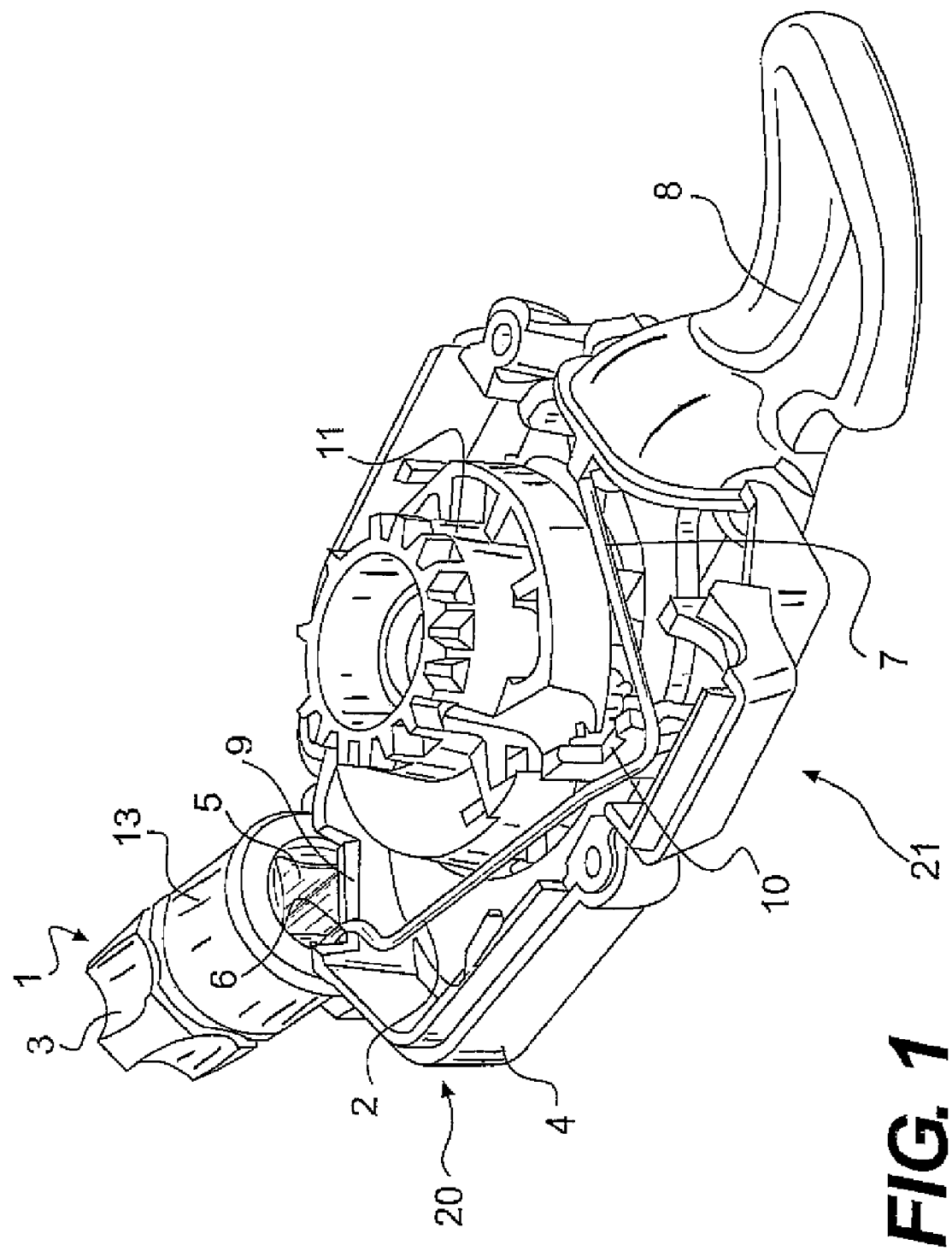
FIG. 1 is a perspective view of a control cable adjustment device connected to a shifter in accordance with one embodiment of the present invention.

FIG. 1 shows a control cable adjustment device 20 connected to a bicycle shifter 21 in accordance with one embodiment of the present invention. The control cable adjustment device 20 adjusts the length of a control cable (not shown) having an outer casing or sheath and an inner wire that extends between a control mechanism such as the bicycle shifter 21 or brake lever and an operating mechanism such as a derailleur or brake. The control cable adjustment device 20 controls the length of the control cable by moving the sheath relative to the inner wire. The shifter 21 generally includes a housing 4 mountable to a handlebar of a bicycle and a lever 8 movably or pivotally coupled to the housing 4. The lever 8 may be biased by a return spring toward a neutral position. The shifter housing 4 includes a cable guide 13 having an internally threaded bore 15 for receiving the adjustment device 20.

The adjustment device 20 generally includes an adjuster 1 and a spring element 2. The adjuster 1 has first and second ends. At the first end 22 is a receiving bore for the sheath of the control cable and grip recesses 3 to facilitate the turning of the adjuster 1 relative to the housing 4. At the second end 23 is a detent contour 5 and external threads 12. The external threads 12 are screwed into the threaded bore 15 of the shifter housing 4. A control cable insertion opening 14 extends along the adjuster 1 and the cable guide 13, which allows the inner wire to be transversely inserted into the detent contour 5 of the adjuster 1 and the bore 15 of the cable guide 13. Alternatively, the adjuster 1 may not have an insertion opening but has an unbroken or continuous periphery.

The spring element 2 has a retention segment or leg 6 that extends into the detent contour 5 and a spring segment 7 that extends into the shifter housing 4 and biases the release lever 8 toward a neutral position. The detent contour 5 and the retention segment 6 extend coaxially with the external threads 12 on the adjuster 1. To ensure that the retention segment 6 does not move in the detent contour 5 as the adjuster 1 is screwed in and out of the shifter housing 4, the retention segment 6 is braced in a cutout 9 in the shifter housing 4. The height of the cutout 9 is such that it braces the retention segment 6 but also allows passage of the inner wire. The cutout 9 also prevents the retention segment 6 from jamming in the insertion opening 14. Further, the detent contour 5 has enough free space to not impede the operation of the control cable or the retention segment 6. The spring element 2 is guided through the shifter housing 4 around a centrally located shifting mechanism 11 and is held by a brace 10 which allows the two segments 6, 7 to function as two springs relatively independent of one another.

Figure 2:
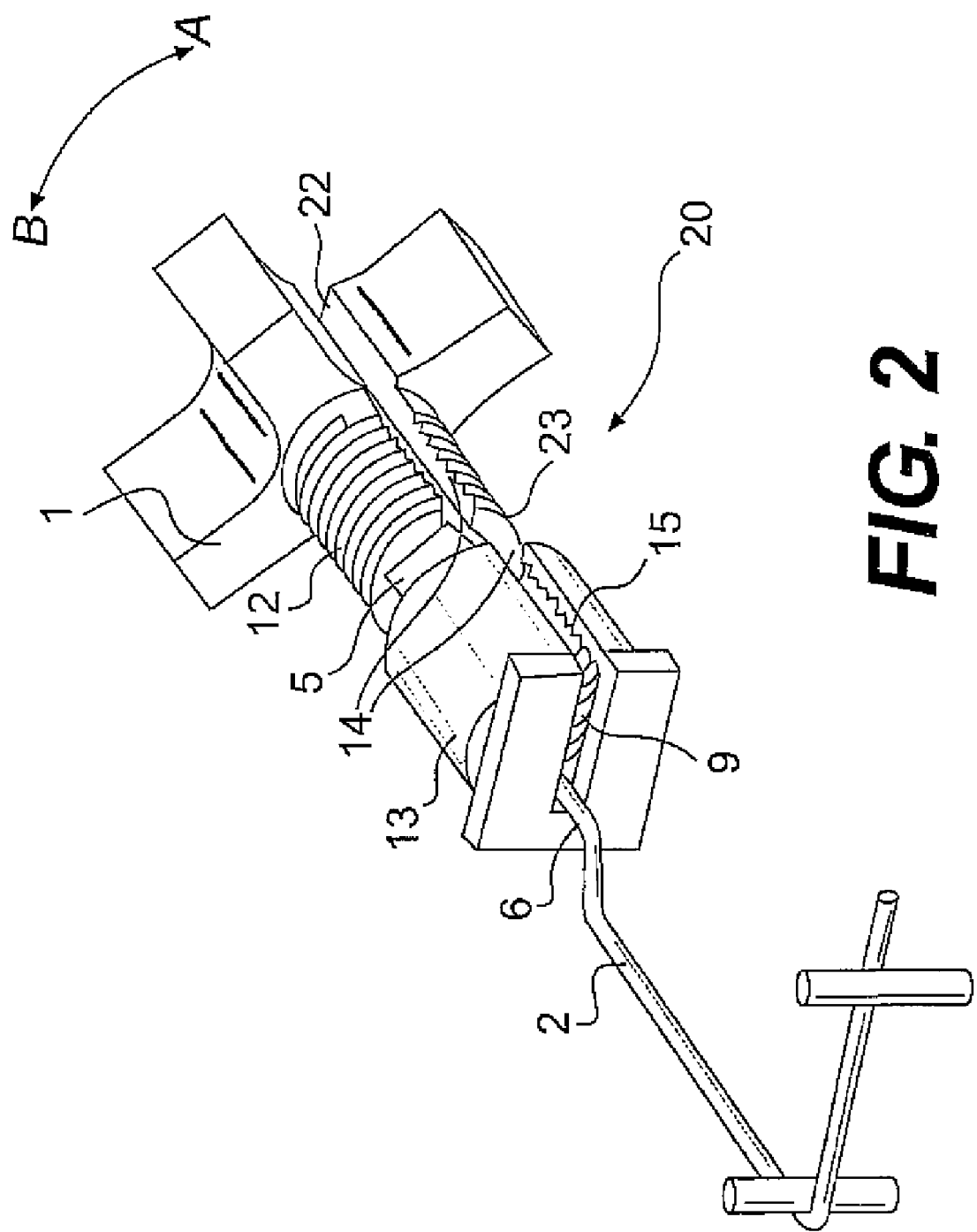
FIG. 2 is a perspective view of a control cable adjustment device in accordance with another embodiment of the present invention.

FIG. 2 illustrates a similar adjuster 1 as shown in FIG. 1 except that the detent contour 5 has a cross section in the shape of a rectangle with rounded corners. However, the cross section can be various different shapes, for example, a circle with flutes 36 to receive the retention segment 6 (see FIG. 3) or, as shown in FIG. 1, a polygon with convex sides. The cross section of the detent contour 5 can also have varying surfaces configured to engage the retention segment 6 such that different forces occur when adjuster 1 is screwed in or out. Preferably, there are high rotational forces in the screwing first direction A and low rotational forces in the unscrewing second direction B.

Figure 3:
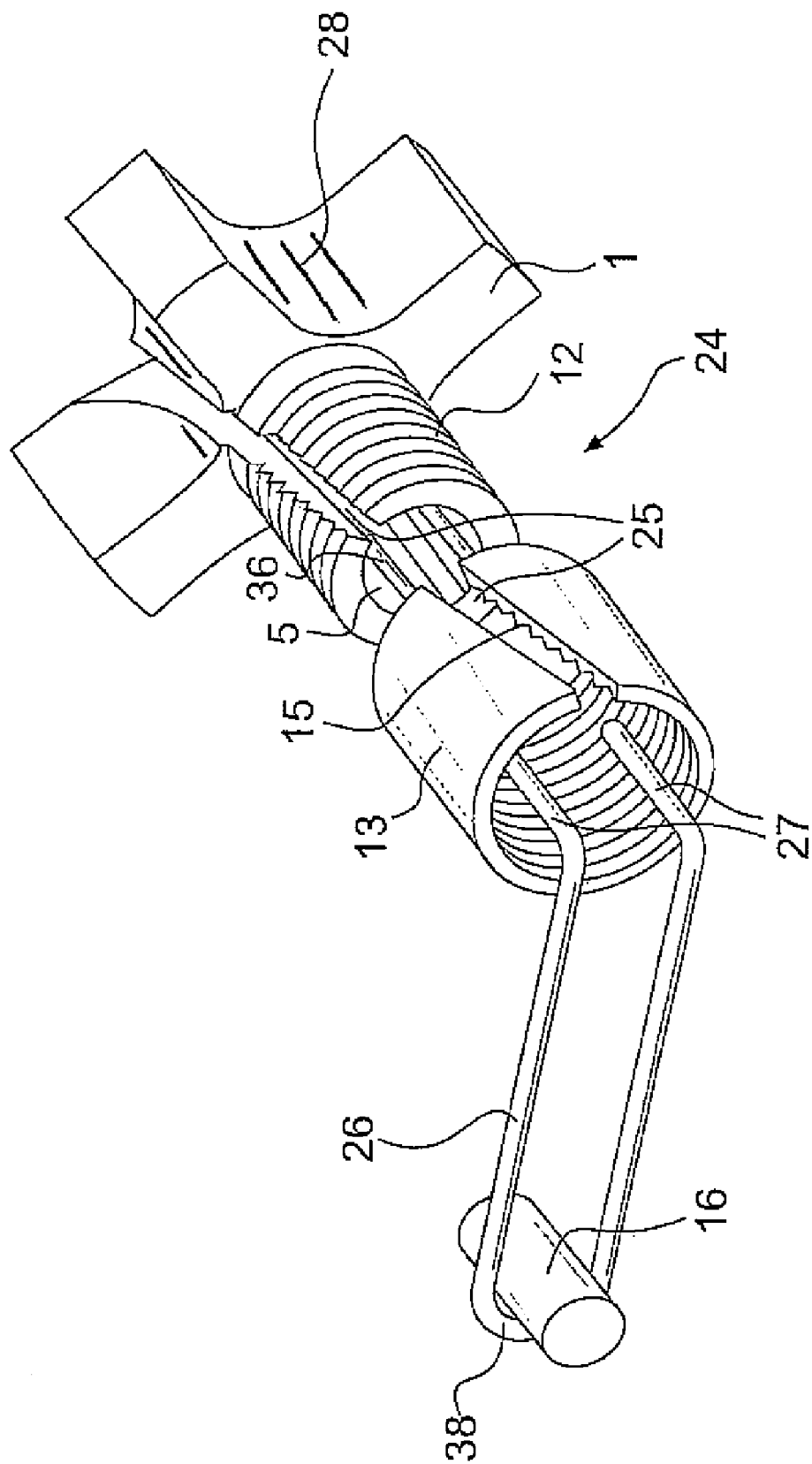
FIG. 3 is a perspective view of a control cable adjustment device in accordance with another embodiment of the present invention.

FIG. 3 shows another embodiment of the present invention wherein an adjuster 24 has a control cable insertion slot 25 that extends obliquely, rather than parallel to the inner wire of the control cable as shown in FIG. 2 and a spring element 26 having a retention segment, in this embodiment, two flexible segments 27. The oblique profile of the control cable insertion slot 25 prevents the retention segments 27, which extends parallel to the control cable, from penetrating into the control cable insertion slot 25. In the installed state, when the threads 12 are screwed into the threaded bore 15 on the housing segment 13, the retention segments 27 engage the detent contour 5. In this embodiment, the spring element 26 functions only as a detent spring. Another segment 38 of the spring element 26 is braced around a fixed point 16 on a housing (not shown) similar to the housing 4 shown in FIG. 1 and the retention segments 27, which are preloaded in the direction of the detent contour 5, extend into the adjuster 24. The adjuster 24 has pronounced grip recesses 28 to allow easy adjustment of the control cable. This embodiment of the control cable adjustment device is particularly suitable for twist-grip shifters and brake actuation systems.

Figure 5:
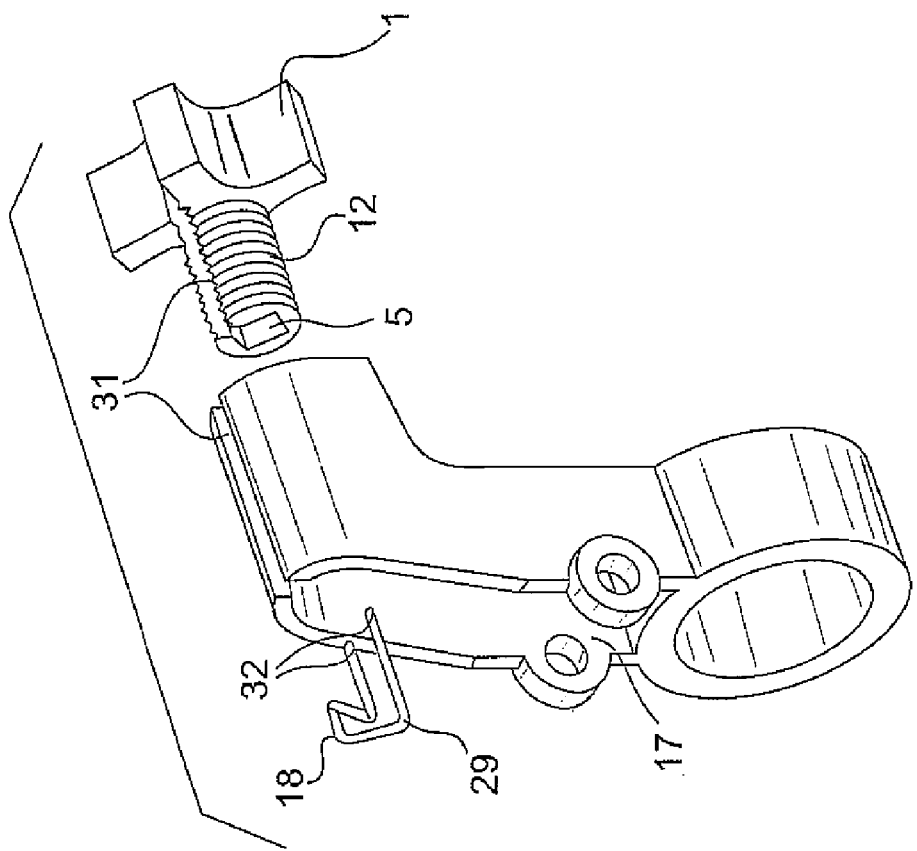
FIG. 5 is a perspective view of a control cable adjustment device in accordance with another embodiment of the present invention.
Figure 4:
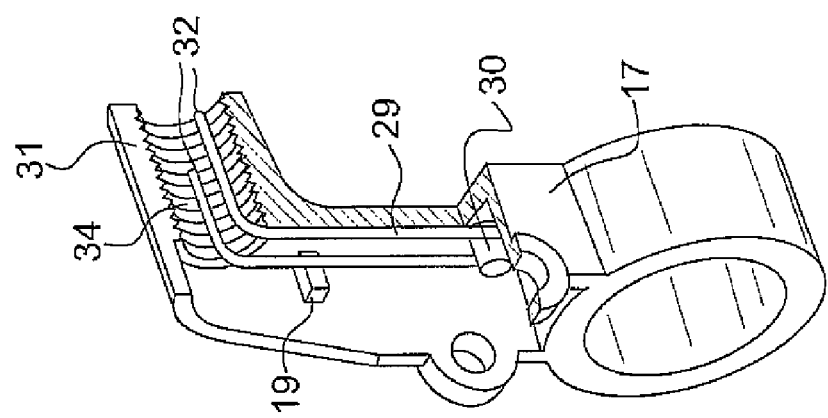
FIG. 4 is a perspective view of a control cable adjustment device in accordance with another embodiment of the present invention.

FIGS. 4 and 5 show other embodiments of the present invention wherein a spring element 29 is braced against a brace 30 in a brake lever housing 17, see FIG. 4, and is braced in a control cable insertion slot 31, see FIG. 5. The spring element 29 has retention segments 32 that, in the installed state, extend into the detent contour 5 of the adjuster 1. To ensure that the retention segments 32 do not become jammed in the insertion slot 31, the movement of the retention segments 32 is restricted by a stop 19 located on the brake housing 17. Further, the spring element 29 is placed around the brace 30 to ensure that it remains in a defined position in the brake housing 17.

The adjuster 1 has threads 12 that are screwed into a threaded bore 34 of the brake housing 17. When the control cable insertion slots 31 of the adjuster 1 and the brake lever housing 17 are aligned with one another, the control cable can be hooked onto the brake lever and inserted into the control cable insertion slot 31. To insert the one end of the spring element 29 into the adjuster 1 and to insert the other end of the spring element 29 into the control cable insertion slot 31 on the brake lever housing 17, the brake lever must be depressed. The spring element 29 includes a support segment 18 that is inserted into the control cable insertion slot 31 of the brake housing 17 and having a configuration such that the spring element 29 is prevented from rotating. When the spring element 29 is installed, it is prevented from falling out of the brake housing 17 by the preload force of the retention segments 32 directed against the detent contour 5 and by the brake lever when it is not depressed.

While this invention has been described by reference to specific embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A control cable adjustment device for adjusting a control cable extending between a control mechanism and an operating mechanism, the adjustment device comprising:
an adjuster rotatably connected to a housing of the control mechanism such that the adjuster is axially moved relative to the housing in response to rotation of the adjuster;
a spring element having a retention segment and a spring segment; and
a detent contour extending along an interior surface of the adjuster,
the retention segment of the spring element engaged with the detent contour to retain the adjuster in a current position and the spring segment of the spring element biasing the control mechanism.

2. The control cable adjustment device of claim 1, wherein the spring element is a wireform spring, the retention segment of the spring extending substantially parallel to the control cable extending through the adjuster.

3. The control cable adjustment device of claim 2, wherein the retention segment includes at least two flexible segments extending substantially parallel to a portion of the control cable extending through the adjuster, the two flexible segments engaging an inner surface of the detent contour of the adjuster, the two flexible segments preloaded in the radial direction.

4. The control cable adjustment device of claim 3, wherein upon rotation of the adjuster, the flexible segments are supported by the housing near the adjuster.

5. The control cable adjustment device of claim 1, wherein the retention segment indexes the adjuster and the spring segment biases one of a release lever of a shifter and a brake lever toward a neutral position.

6. The control cable adjustment device of claim 5, wherein the retention segment is braced torsionally against the housing, and a deflection motion of the retention segment is in the radial direction.

7. The control cable adjustment device of claim 5, wherein the retention segment includes at least two flexible segments extending substantially parallel to the control cable extending through the adjuster, the two flexible segments engaging an inner surface of the detent contour of the adjuster, the two flexible segments preloaded in the radial direction.

8. The control cable adjustment device of claim 7, wherein upon rotation of the adjuster, the flexible segments are supported by the housing near the adjuster.

9. The control cable adjustment device of claim 5, wherein the detent contour includes varying surfaces configured to engage the retention segment such that rotation of the adjuster in a first direction requires a higher rotational force than rotation of the adjuster in a second direction.

10. The control cable adjustment device of claim 5, wherein the detent contour has a non-round cross section and is configured such that the retention segment has freedom to deflect, the retention segment configured to extend substantially parallel with the control cable extending through the adjuster.

11. The control cable adjustment device of claim 1, wherein the retention segment is braced torsionally against the housing, and a deflection motion of the retention segment is in the radial direction.

12. The control cable adjustment device of claim 1, wherein the spring element is guided through the housing, and the retention segment is supported by the housing near the adjuster.

13. The control cable adjustment device of claim 1, wherein the detent contour has a non-round cross section and is configured such that the retention segment has freedom to deflect, the retention segment configured to extend substantially parallel with a portion of the control cable extending through the adjuster.

14. The control cable adjustment device of claim 1, wherein the detent contour has flutes extending in an axial direction of the adjuster.

15. The control cable adjustment device of claim 1, wherein the adjuster has a continuous periphery and a thread for matingly engaging the housing, the detent contour extending coaxially with the adjuster thread.

16. The control cable adjustment device of claim 1, wherein the adjuster has a control cable insertion slot that is offset from a portion of the control cable extending through the adjuster so that the spring element is prevented from entering the control cable insertion slot.

17. The control cable adjustment device of claim 1, wherein the radial motion of the retention segment of the spring element is restricted by at least one stop located in the housing for preventing the spring element from entering the control cable insertion slot.

18. The control cable adjustment device of claim 1, wherein the detent contour includes varying surfaces configured to engage the retention segment such that rotation of the adjuster in a first direction requires a higher rotational force than rotation of the adjuster in a second direction.

* * * * *